May 19, 1970     S. S. PRITCHARD, JR     3,512,702
SEND AND RETURN MAILING ENVELOPE AND PACKAGE
Filed Oct. 31, 1968     4 Sheets-Sheet 1
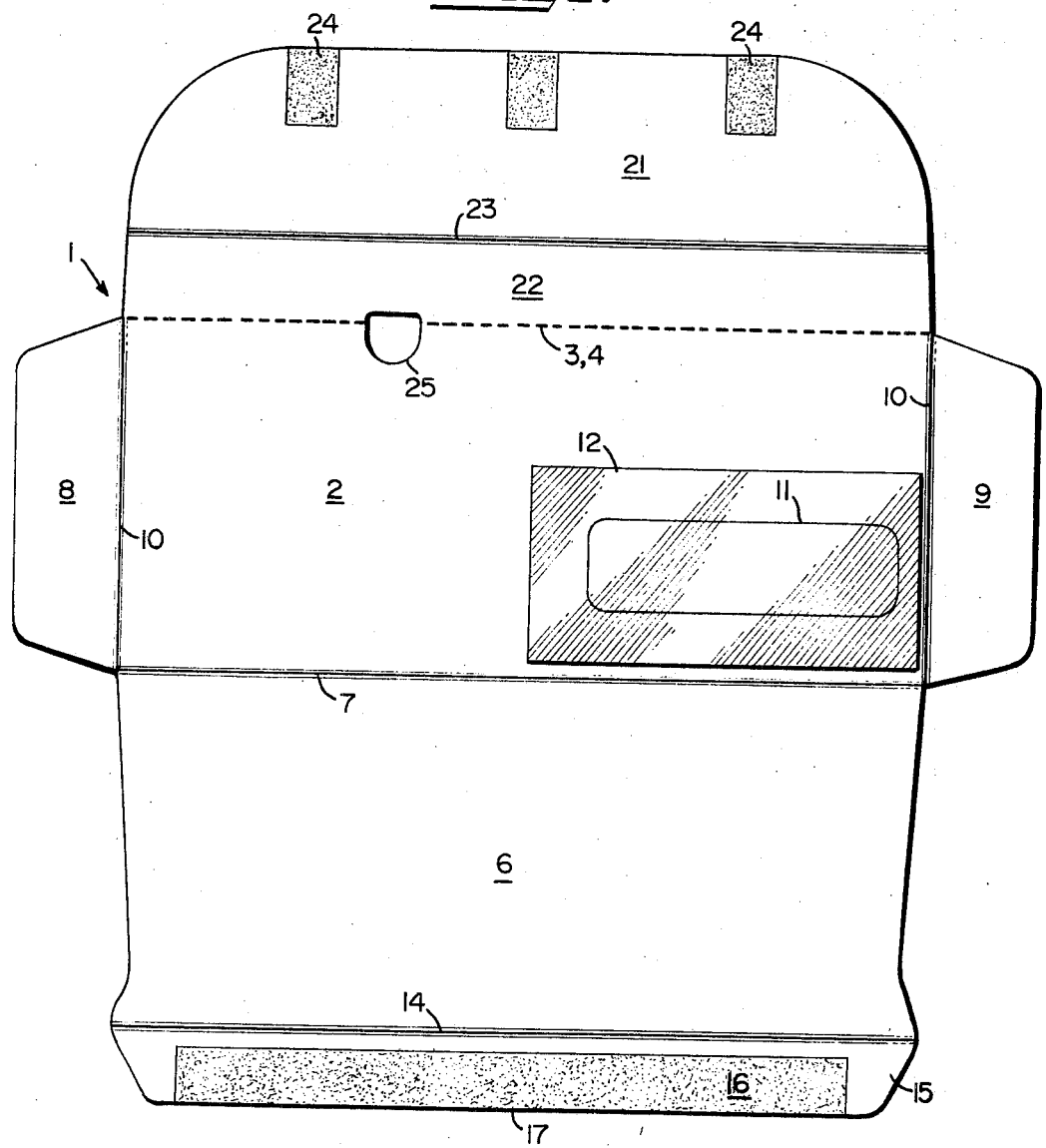
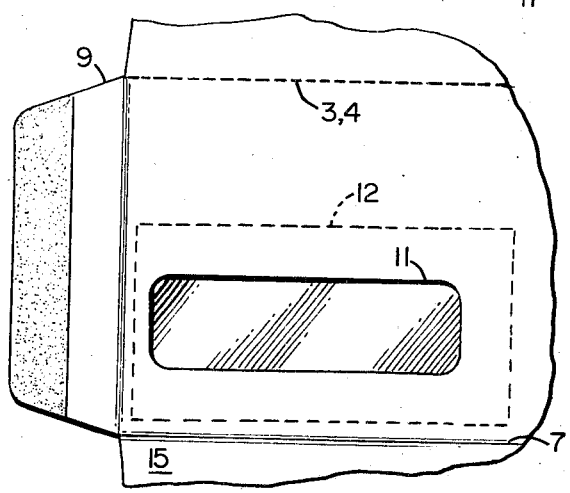
INVENTOR
SHELDON S. PRITCHARD, JR.
Daniel P. Worth
ATTORNEY May 19, 1970 S. S. PRITCHARD, JR 3,512,702
SEND AND RETURN MAILING ENVELOPE AND PACKAGE
Filed Oct. 31, 1968 4 Sheets-Sheet 2
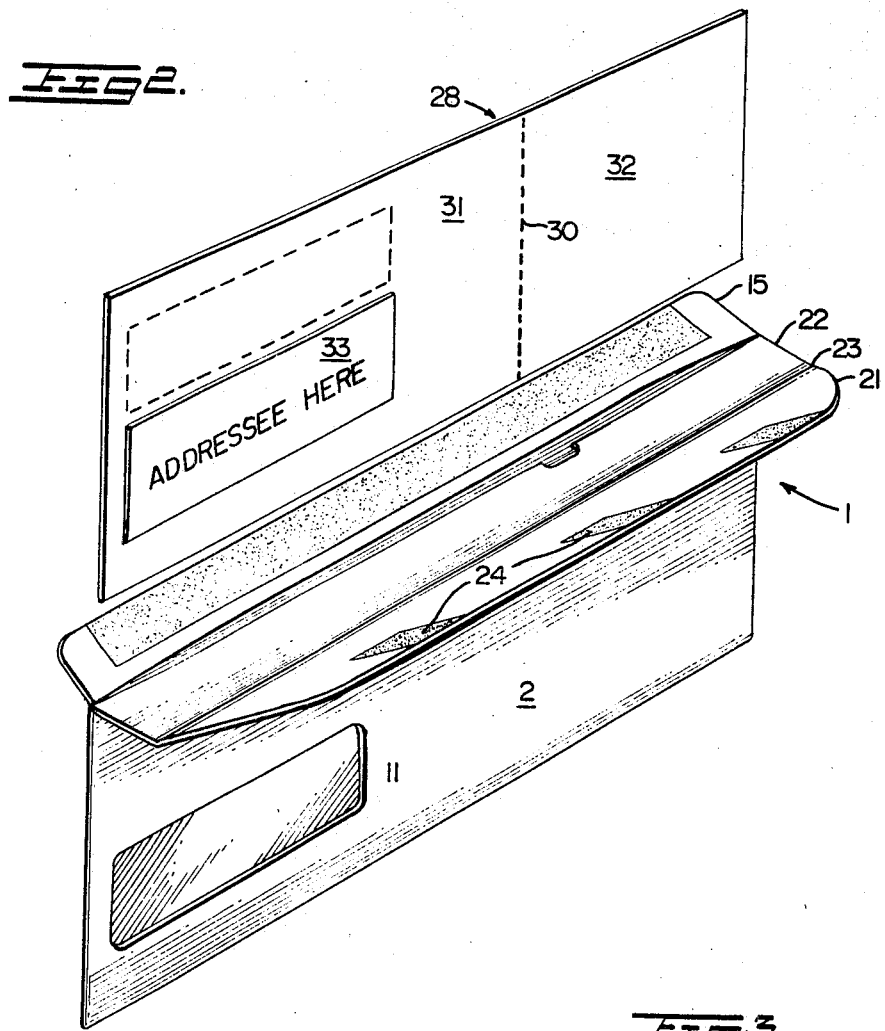
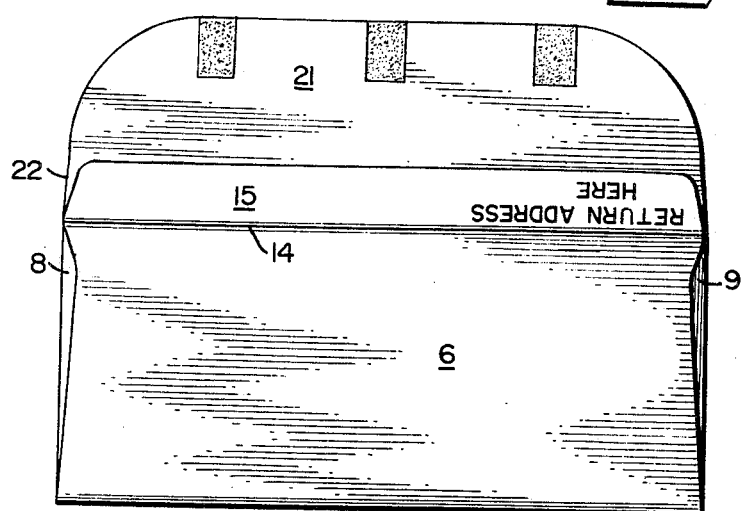
INVENTOR
SHELDON S. PRITCHARD, JR.
ATTORNEY May 19, 1970 S. S. PRITCHARD, JR 3,512,702
SEND AND RETURN MAILING ENVELOPE AND PACKAGE
Filed Oct. 31, 1968 4 Sheets-Sheet 3
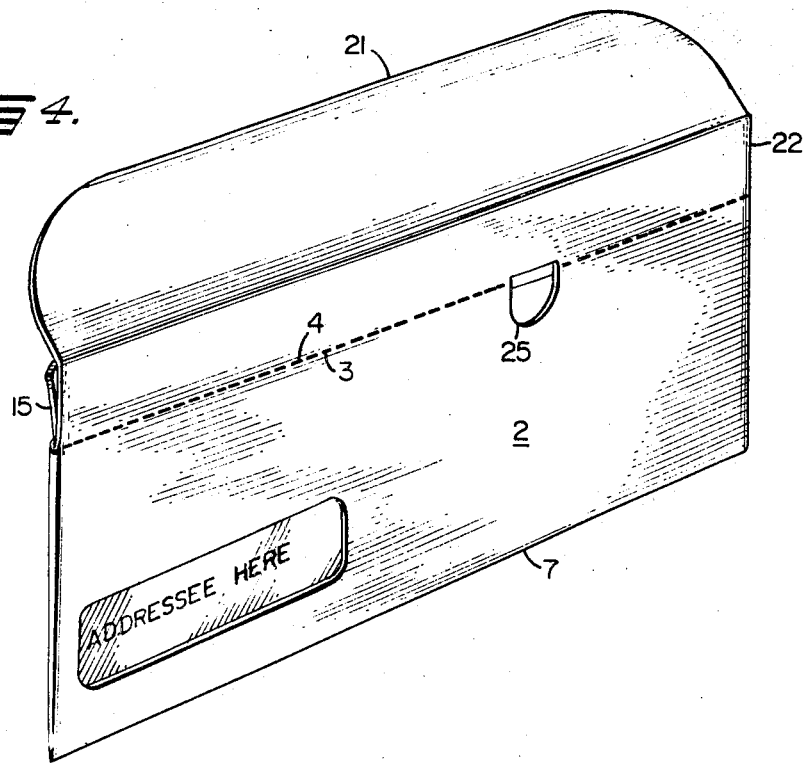
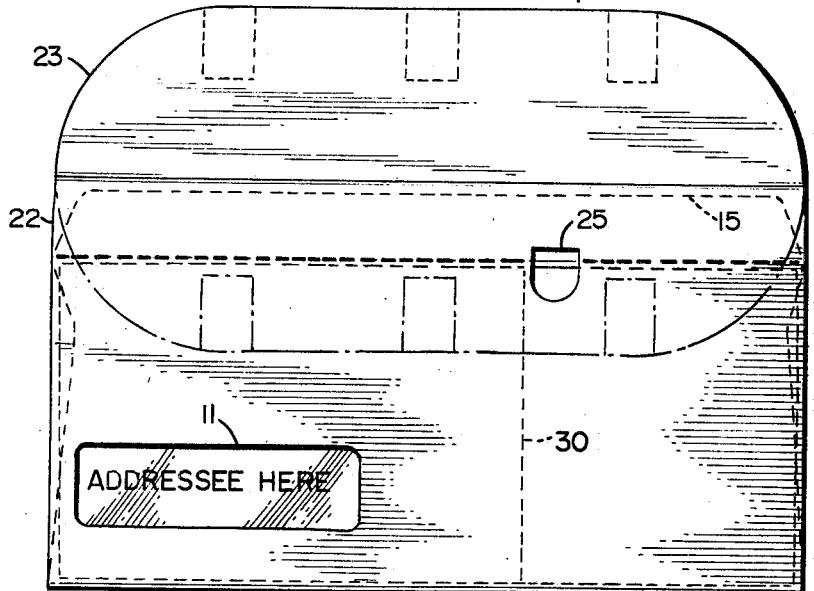
INVENTOR
SHELDON S. PRITCHARD, JR.
ATTORNEY May 19, 1970     S. S. PRITCHARD, JR     3,512,702
SEND AND RETURN MAILING ENVELOPE AND PACKAGE
Filed Oct. 31, 1968     4 Sheets-Sheet 4
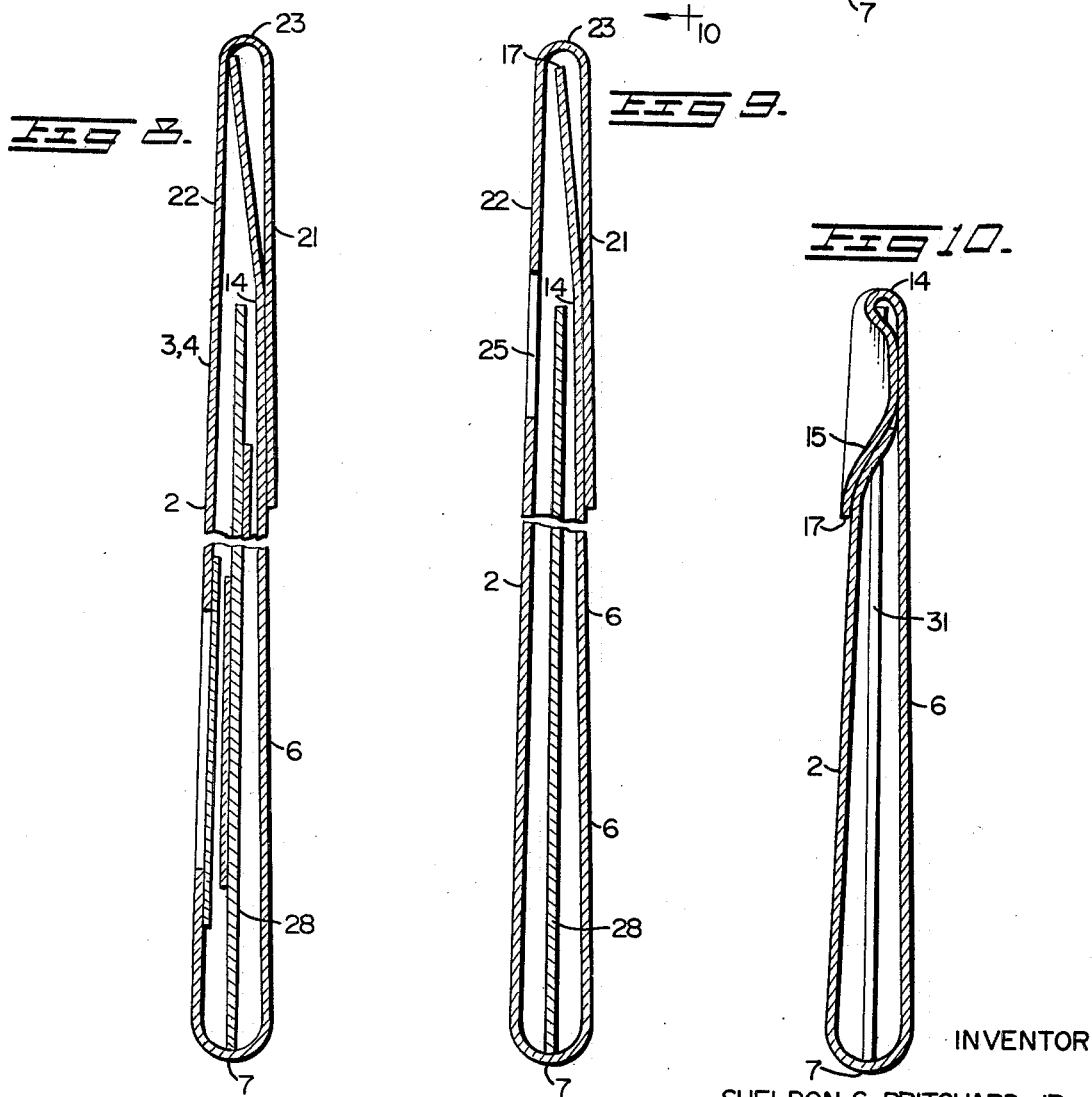
INVENTOR
SHELDON S. PRITCHARD, JR.
ATTORNEY

United States Patent Office 3,512,702
Patented May 19, 1970

---

3,512,702
SEND AND RETURN MAILING ENVELOPE AND PACKAGE
Sheldon S. Pritchard, Jr., Seattle, Wash., assignor to U.S. Plywood-Champion Papers Inc., a corporation of New York
Filed Oct. 31, 1968, Ser. No. 772,214
Int. Cl. B65d 27/06
U.S. Cl. 229—73                                 5 Claims

ABSTRACT OF THE DISCLOSURE

A send and return envelope and package including same is provided wherein the envelope has a pair of seal flaps one of which is used to seal the envelope when the package is sent out and the other of which is the seal flap for returning same. The package includes such an envelope and a computer punch card that is separable into two portions.

BACKGROUND OF THE INVENTION

This invention relates to send and return envelopes and packages relating to same. The invention is particularly useful in the mailing of a data processing card or business cards such as the punched cards used in computers for periodic payments (e.g., a monthly mortagage payment) of a statement combined with record keeping stubs, the stub being detachable from the rest of the card.

Send and return envelopes broadly speaking are old. The general concept is to provide an envelope so constructed that it can be used for mailing to an addressee and then in turn used by the addressee to return certain information to the sender. In many of these transactions, especially banking transactions, it is desired to mail to a customer a statement of his account in such form that the customer can have a written record of transactions for his own record keeping purposes while at the same time the bank provides a data processing card, which may optionally have information punched thereon (e.g., the International Business Machine card) suitable for return with a check by the customer and processing through a computer or similar machine.

SUMMARY OF THE INVENTION

The present invention deals with a send and return window envelope whereby a data processing card displays the send ,e.g., the customer's) address and the return (e.g., bank) address in the window when properly positioned in the envelope. Moreover, the card is separable into two parts one of which is retained by the customer and the second part is returned to the bank. The second part has the addresses printed thereon. The envelope is so constructed and arranged that the address displayed by the second part is held in register with the window by structural features of the envelope when the second part of the data card is enclosed therewithin.

It is an object of this invention to provide a send and return mailing envelope. It is another object of this invention to provide a package that includes a send and return mailing envelope that encloses a data processing card.

An advantage of the present invention is that a preprinted data processing card (hereafter called a business card) with addresses can be used with a window envelope. The window envelope is constructed and arranged so that the addresses are, when the card or a part of a card is properly positioned within the envelope, displayed in the window and prevented from shifting away from the window even though the card or portion thereof is smaller than the envelope.

Other objects, advantages and features will become apparent from a reading of the following description and drawings wherein:

FIG. 1 is a pattern layout as seen from the inside of the envelope blank comprising the present invention.

FIG. 1A is a partial front view of the outside of the blank of FIG. 1 showing gum on the side flaps.

FIG. 2 is an exploded perspective view of the assembled blank shown in FIG. 1 in position to receive a mailing insert.

FIG. 3. is a rear elevational view of the envelope with the sealing flap in raised position.

FIG. 4 is a perspective view of the front of the assembled enveloped of FIG. 3 with the sealing flap partially folded.

FIG. 5 is a front elevational view similar to FIG. 4 showing the sealing flap in full line in the raised position and in phantom line in the sealed position.

FIG. 6 is a front elevational view of a business card used as a mailing insert.

FIG. 7 is a front elevational view of the envelope as employed for return mail.

FIG. 8 is an enlarged detailed vertical sectional view taken along the line 8—8 of FIG. 5 showing the flap in the sealed position, the envelope being puffed for clarity of illustration.

FIG. 9 is a similar sectional view taken along the line 9—9 of FIG. 5, the envelope being puffed for clarity of illustration.

FIG. 10 is an enlarged detailed vertical sectional view taken along the line 10—10 of FIG. 7 showing the return flap in the sealed position, the envelope being puffed for clarity of illustration.

Referring now to FIGS. 1 and 1A of the drawings there is shown an envelope blank 1 for a mailing envelope which comprises a front panel 2 of generally rectangular shape and having an upper edge 3 along which extends a perforation line 4. A back panel 6 is hingedly connected to the front panel by bottom score line 7. The front panel has side flaps 8 and 9 connected by score lines 10 on opposite ends thereof.

The back panel is rectangular in shape and in the preferred embodiment the side panels 8 and 9 are narrow and either rectangular or trapezoidal in shape. The front panel also has therein a window 11 through which addresses can be displayed. The window may optionally have a patch 12 of suitable transparent material such as cellophane, polyethylene or the like glued into place.

The upper edge 14 of the back panel 6 is defined by a score line 14 which separates the back panel from the return seal flap 15. The score line 14 and back panel upper edge are approximately equal in width to the width of the front panel upper edge 3. The return flange flap preferably has a strip of gum 16 located along a substantial portion of its free edge 17.

A send seal flap 21 and spacer panel 22 surmount the front panel. The spacer panel lies between the send seal flap and the front panel and is approximately equal in height to the height of return flap 15 whereby folding of the send seal flap as shown in FIGS. 4, 5, 8, and 9 will not be interefered with by the return seal flap 15. The spacer panel has perforation line 4 on one side and a second score line 23 on the other side. The send seal flap (FIG. 4, 8, 9) bends about the score line 23.

The send seal flap also has gum located on its inside anl along or adjacent to its free edge. Preferably, the gum is disposed in a plurality of small gum spots 24. The space between the gum spots 24 is such as to allow insertion of a finger or other instrument between the spots when opening the envelope. this makes it easier to open the envelope and also prevents destruction of the envelope. Avoidance of destruction is desirable because it is intended that the same be used a second time as a return envelope.

The send seal flap 21 has a height (dimension normal to line 23) such as to position gum 24 below score line 14 when the envelope is assembled for a sending function (see FIGS. 3, 8, 9).

Adjacent the perforation line 4 is a hole 25 that is cut for the most part in the front panel and to a slight extent also includes a portion removed from the spacer panel. This hole is so located that it will be in register with the gum 16 on the return flap when the latter is folded over the front panel upper edge in the course of preparing the envelope for a return mailing. The hole 25 is also spaced laterally along the envelope from the window so that the perforation line 30 (FIGS. 5, 6) in the business card 28 will register with the hole and preferably will be at one side of it as illustrated in FIG. 5. This will secure the business card in place and hold the address display panel of part of the business card in register with the window.

A typical business card 28 is illustrated in FIG. 6 as comprising a first panel 31 and a second panel 32 which are detachably connected together by the aforementioned perforation line 30. An address space 33 is provided on at least one side of the business card and ordinarily a pre-printed address is printed in tis space. The back side of the card may also have an adress thereon in a similarly located panel. In a typical send and return function using the present invention, the business card 28 (at this time comprising both halves 31 and 32 connected together) is inserted in the envelope as illustrated in FIG. 2 with the address in the address space 33 located so that it will come into register with the window 11. Then (FIG. 4) send seal flap 21 is folded back about score line 23 and secured by the gum spots 24 to the back panel at a position somewhere below score line 14.

The envelope is then mailed. When received by the customer, he inserts his fingers between the gum spots 24 and moves them back and forth thereby separating the send seal flap from the back panel. The send seal flap and spacer panel 22 are then separated from the front panel by tearing along perforation line 4. The business card 28 is then removed from the envelope, separated into its two component parts, the panel 31 is then reinserted in the envelope in the position illustrated in FIG. 7 with the address space 33 displayed in the window (this being the return address) and any other enclosures such as checks, money or the like are placed in the envelope behind the panel 33.

The return seal flap 15 is then folded (FIGS. 7, 10) along its score line 14 over the upper edge of the front panel, the gum 16 is moistened, and pressed into position whereupon a portion of the gum will come into register with the hole 25 and with the underlying part of the inside of the back panel. This will secure the panel portion 31 in the position shown in FIG. 5 and prevent the address 33 from slipping away from the window 11.

It will be observed that the panel 31 has the address space 33 for return mailing located thereon so that the space 33 is in register with the window 11 to thereby display the address for the return mailing when the second panel 32 has been detached and the perforation line 30 brought into register with the hole 25. In the preferred embodiment as shown in FIG. 7 the register between line 30 and hole 25 places the line 30 to the left of the hole whereby no gum actually comes in contact with the part panel 31 (FIGS. 5 and 7).

The hole 25 is preferably located slightly to one side of the edge 30 of the panel, i.e., is spaced from the left end (as seen in FIG. 7) of the envelope a distance slightly greater than the width of the panel 31 whereby the return mail address (addressor) in space 33 is displayed in the window 11 and the gummed or adhesive connection between the return flap 15 and back panel 6 (as shown in FIG. 10) retains panel 31 in position lengthwise of the envelope. By the terms "slightly to one side of" and "distance slightly greater than" I mean a dimension between the left end of hole 25 and the left edge of the envelope, as viewed in FIG. 7, sufficient to allow insertion of the panel 31 between the hole and envelope left end: for example an envelope that is 8 inches long and 3⅜ inches wide for returning a panel 31 that is 4⅞ inches long and 3¼ inches wide has a space of 5 1/16 inches between the hole left edge and the envelope left end. The distance between the hole left edge and envelope left end can be in the range from about 1/16 to 5/16 inches longer than the length of the panel 31: thus said distance is slightly greater than the length of panel 31 by an amount in the range from 1/16 to 5/16 inches. The gummed connection through hole 25 and the height of the envelope respectively keep the panel 31 in longitudinal and vertical alignment so that the address remains displayed in the window.

The invention claimed is:

1. A send and return mailing envelope comprising
   a front panel of generally rectangular shape and having an upper edge defined by a perforation line;
   a window in said front panel;
   a back panel hingedly connected along a bottom score line to said front panel and having an upper edge substantially as wide as said front panel;
   a return seal flap surmounting said back panel and connected by another score line to the upper edge of said back panel, said another score line being substantially in register with said front panel upper edge;
   gum on the inside of said return flap;
   a send seal flap surmounting said front panel;
   a spacer panel between said front panel upper edge and said send seal flap;
   a third score line hingedly connecting said spacer panel to said send seal flap; and
   a hole in said front panel adjacent to said perforation line and located to be in register with a portion of the gum on said return flap when the latter is folded over said front panel upper edge and said spacer panel and send seal flap are removed by detaching along said perforation line.

2. A send and return mailing envelope according to claim 1 wherein said gum consists in a plurality of spots spaced along the free edge of said send seal flap, the space between the spots being such as to allow insertion of a finger between the spots when opening said envelope.

3. A package that includes a send and return mailing envelope enclosing a mailing card, said send and return mailing envelope comprising:
   a front panel of generally rectangular shape and having an upper edge defined by a perforation line;
   a window in said front panel;
   a back panel hingedly connected along a bottom score line to said front panel and having an upper edge substantially as wide as said front panel;
   a return seal flap surmounting said back panel and connected by another score line to the upper edge of said back panel, said another score line being substantially in register with said front panel upper edge;
   gum on the inside of said return seal flap;
   a send seal flap surmounting said front panel;
   a spacer panel between said front panel upper edge and said send seal flap;
   said perforation line connecting said spacer panel to said front panel upper edge and located substantially in register with said back panel upper edge;
   a third score line connecting said spacer panel to said send flap;
   a hole in said front panel located relative to said window to be in register with a portion of the gum on said return flap when the latter is folded over said front panel upper edge and said spacer panel and send seal flap are removed by detaching along said perforation line; and said mailing card being substantially the height of said front panel and further comprising first and second card panels detachably connected by a second perforation line that runs substantially perpendicular to said first perforation line and is in register with said hole;

said first panel having an address space thereon that is registrable with said window when said second panel has been detached, said first panel is enclosed within said envelope, and said second perforation line is brought into register with said hole.

4. A send and return mailing envelope according to claim 3 wherein said hole is located slightly to one side of said perforation line.

5. A send and return mailing envelope according to claim 3 wherein said gum consists in a plurality of spots spaced along the free edge of said send seal flap, the space between the spots being such as to allow insertion of a finger between the spots when opening said envelope.

References Cited

UNITED STATES PATENTS

| 1,373,512 | 4/1921 | Kuhhorn | 229—73 |
| 1,596,972 | 8/1926 | Hogan | 229—80 |
| 3,062,431 | 11/1962 | Rabenold | 229—73 |
| 3,356,285 | 12/1967 | Greason | 229—80 |

FOREIGN PATENTS 3,058   6/1912   Great Britain.

DAVID M. BOCKENEK, Primary Examiner

U.S. Cl. X.R.

229—71, 80